United States Patent [19]
Seidel

[11] 3,959,887
[45] June 1, 1976

[54] DEVICE FOR PRECISION MEASUREMENT OF INTERNAL DIAMETERS

[75] Inventor: Karlheinz Seidel, Olching, Germany

[73] Assignee: Maschinenfabrik Augsburg-Nurnberg AG, Germany

[22] Filed: July 10, 1974

[21] Appl. No.: 487,134

[30] Foreign Application Priority Data
July 10, 1973 Germany............................ 2334962

[52] U.S. Cl.................................. 33/178 R; 29/415
[51] Int. Cl.².......................................... G01B 3/46
[58] Field of Search............ 33/178 R, 178 B, 147 I, 33/199 R

[56] References Cited
UNITED STATES PATENTS

| | | | |
|---|---|---|---|
| 953,282 | 3/1910 | Nash .................................. | 33/178 R |
| 1,385,477 | 7/1921 | Semones ........................... | 33/178 R |
| 1,664,535 | 4/1928 | Bartholdy.......................... | 33/178 R |
| 2,879,605 | 3/1959 | McLaughlin....................... | 33/178 R |

*Primary Examiner*—William D. Martin, Jr.
*Attorney, Agent, or Firm*—Craig & Antonelli

[57] ABSTRACT

Device for precision measurement of the internal diameter of thin-walled pipes including a commercial three-point inside micrometer with one part-cylindrical shaped jaw segment connected to each of the three points of the micrometer and dimensioned so as to exhibit outer surfaces arranged in an ideal circle having a diameter equal to the nominal inside diameter of the pipe being measured. These three jaw segments are formed by radially slitting a cylindrical body having an outer circumference corresponding to an ideal circle having the diameter of the nominal internal diameter of a pipe to be measured. The slitting extends radially so as to form symmetrical 120° circular arc portions for each jaw segment, with the small slits accommodating a retraction of the jaw segments to a slightly smaller diameter for insertion into the pipe, wherein they are expanded by the micrometer screw and associated feelers to conform to the inside of the pipe and to clampingly engage the inside of the pipe into an ideal circular arrangement. Preferred embodiments further include axial stop faces at the jaw segments, as well as jaw segments having a stepped configuration exhibiting a plurality of different nominal diameter outer surface configurations.

2 Claims, 3 Drawing Figures

3,959,887

DEVICE FOR PRECISION MEASUREMENT OF INTERNAL DIAMETERS

BACKGROUND AND SUMMARY OF THE INVENTION

The present invention relates to a device for the precision measurement of internal diameters of thin-walled pipes.

The measurement of the internal diameter of such pipes poses problems in that their shape almost invariably deviates from an ideal circle and exhibits a certain amount of ovality as a result of internal stresses set-up in manufacture, of hardening warp or of sheer weight. Conventional measuring means will then fail to give precise measurements of the internal diameter.

It has been previously contemplated to obtain precise measurements of internal diameters with the aid of roundness-flatness measuring machines used to scan the imperfectly round contour of the pipe, after which a computer is used for precise definition of the length of scanned contour which is then transformed into a circle of like length of arc and exact roundness, which is ultimately compared with a master ring representing an ideally round circle of accurately defined diameter. While this known method gives great precision, it necessitates a very costly and complex measuring machine as well as a considerable amount of time in the determination of the internal pipe diameter. This makes this known method ill-suited for production pipe inspection.

In a broad aspect, the present invention provides a device for accurately and rapidly determining the internal diameter of thin-walled pipes in the rough environment of production and production inspection. The device requires little cost and, for ease of changing locations, little weight.

The present invention more particularly contemplates providing a device characterized by an approximately cylindrical body divided into at least three jaw segments and having a diameter slightly less than the internal diameter to be measured, where the jaw segments centrically extend apart to form radially open circumferential gaps between them.

For precision measurement of the internal diameter of thin-walled pipes, the cylindrical body is inserted in the pipe and the jaw segments are then centrically extended apart. The thin-walled pipe is circularly clamped in the process along substantially the entire circumference of the inside wall of the pipe. The amount of extension of the jaw segments is measured on a scale, with a previously determined zero point for reference, for accurate evidence of the internal diameter of the thin-walled pipe. The travel of the jaw segments in centrical extension is minimal and the interruption caused by the radial gaps in the circular contour of the device is acceptable in that any error it produces in the arc length of the circle is minimal and any error in the diameter measured is even less.

The advantages provided by the device arranged in accordance with this invention are seen to lie in its ease of operation which minimizes the risk of error and which more importantly substantially reduces the measuring time associated with the more complex measuring machines discussed above.

Further merits of the device of the present invention are that its relatively small size and weight will not tie it to a permanent location. Ultimately, the price of the device is considerably less than that of presently used measuring machines.

In a further aspect of this invention particularly preferred embodiments of the device are formed by commercial three-point inside micrometer on the feeler points of which are seated jaw segments formed by radially slitting a cylindrical body of the nominal diameter of the pipe to be measured. A key advantage offered by this arrangement of the device is that it is built around a high-grade commercial measuring unit which is fitted with separable attachments to keep the cost of manufacture of the inventive device at a particularly reasonable level. German DAS 1,303,739 shows a micrometer of the type contemplated for use with the present invention.

The jaw segments are made from a cylindrical body of the nominal diameter of the pipe to be measured to make the arched outer surface of the jaw segment match the nominal diameter and to produce gaps, by the width of cut when slitting the cylindrical body radially, which enables the resulting jaw segments to be drawn together over a short distance and the diameter so to be reduced for seating the measuring device, with the jaws closed, in the pipe to be measured.

In further preferred embodiments of the present invention, the jaw segments exhibit a stop face projection radially beyond the arched outer contour. The presence of these stop faces makes for an exactly coaxial fit of the measuring device in the pipe and prevents the device from being cocked and then giving erroneous diameter readings.

In further preferred embodiments of the present invention, the device exhibits various arched outer surfaces on the segments in a stepped arrangement to widen the measuring range. This enables the same measuring unit or the same jaw segments to be used for precision measurements on pipes of various nominal diameters.

In a still further aspect of preferred embodiments of the present invention, the arched outer surfaces of the jaw segments exhibit a length, measured axially from the stop faces, of minimally one-tenth of the internal diameter to be measured. This provides an advantage in that a certain minimum extent of the outer surfaces of the jaws axially prevents the end of the pipe from being slightly expanded by the extending jaws and so giving an erroneous reading.

These and further objects, features and advantages of the present invention will become more obvious from the following description when taken in connection with the accompanying drawings which show, for purposes of illustration only, several embodiments in accordance with the present invention.

DETAILED DESCRIPTION OF THE DRAWINGS

Figure 1:
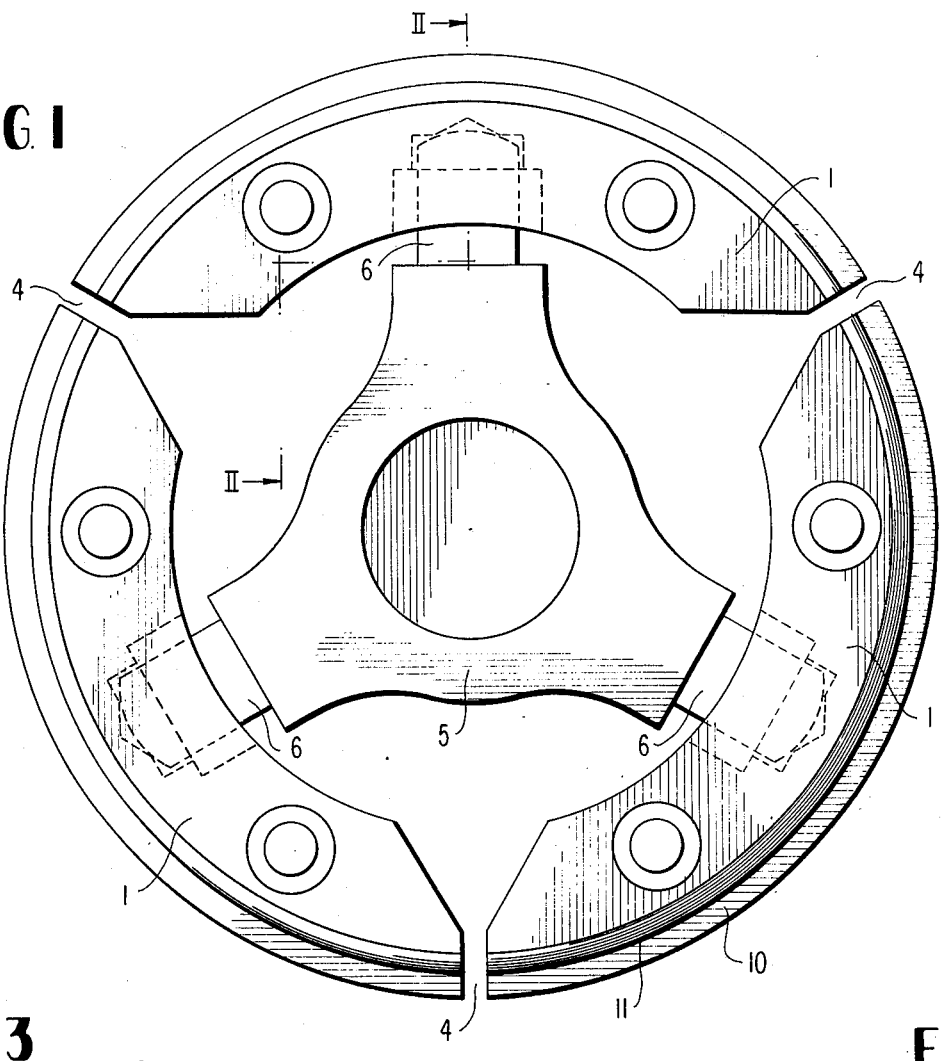
FIG. 1 is a bottom view of the measuring device constructed in accordance with the present invention.

With reference now to FIG. 1, a commercial three-point inside micrometer is indicated by the numeral 5.

Figure 2:
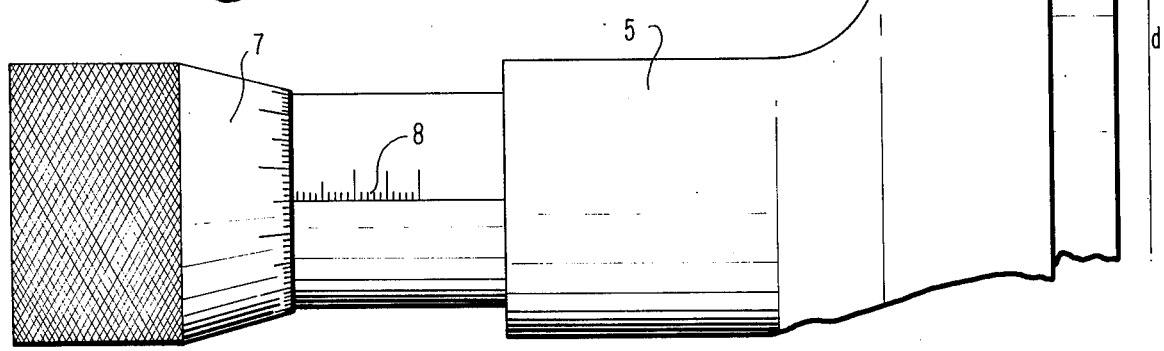
FIG. 2 is a part-sectional view taken at II—II in FIG. 1, with parts cut away for clarity.

Three feeler pins 6 of this three-point inside micrometer are spaced 120° apart for centrical extension and retraction by means of a micrometer screw 7 (FIG. 2). Since such a micrometer 5, in and by itself is of known constructions, the details thereof are dispensed with herein for clarity of disclosure of the present invention.

Seated over the feeler pins 6 are jaw segments 1 formed by radially slitting a cylindrical body of the nominal diameter d of the pipe to be measured. In FIG. 1 the radial gaps 4 produced by slitting are shown wider than they would be in practice for clarity of illustration. The peripheral (circumferential) width of a single gap 4 is preferably not to exceed 1/15 d. The jaw segments 1 exhibit a stop face 10 (FIG. 2) projecting beyond the arched outer surface 11. Such a stop face 10 is preferably accurately formed or machined on the cylindrical body prior to the radial slitting thereof to form the three jaw segments. The jaw segments 1 are detachable but securely connected to the feeler pins 6 so that, in all positions of the jaw segments during movement of the micrometer screw 7, the outer circumference of the jaw segments are symmetrically moved to form an ideal circle when at the predetermined nominal diameter and so that respective wide points of the segments lie on an ideal circle at all times. Embodiments with stop faces such as 10 may have jaw segments 1 pivotable about respective radially oriented axes of the feeler pins, since faces 10 aid in automatic alignment thereof. However, in embodiments without such stop faces, jaw segments 1 should be fixed in position with respect to feeler pins 6. Further, easier handling and higher measuring accuracies are obtained, with or without stop faces 10, if jaws 1 are immovably attached to feeler pins 6.

Before commencing with the measurement, the micrometer screw 7 is operated to centrically retract the feeler pins 6 and the jaw segments 1 with them maximally until the gaps 4 have become zero, (i.e. the jaws are closed). In this condition, the measuring device is inserted in the pipe 9, the internal diameter of which needs accurate definition, until the stop faces 10 of the jaw segments 1 bear against the end face of the pipe 9 (see FIG. 2). The micrometer screw 7 is then operated to centrically radially extend the jaw segments 1 until the arched outer surfaces 11 contact with and uniformly clamp the inner surface of the pipe 9 so that the pipe 9 assumes the shape of an ideal circle. The exact internal diameter can then be read off the scale 8 on the three-point inside micrometer 5.

Figure 3:
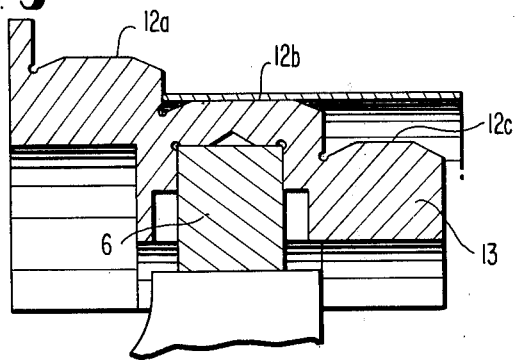
FIG. 3 is a part-sectional view similar to FIG. 2 which illustrates another preferred embodiment with jaw segments in stepped arrangement for accommodating measurement of several different nominal diameter pipes.

For a wider measuring range the preferred embodiment of FIG. 3 includes jaw segments 13 which exhibit a plurality of arched outer surfaces 12, 12b, 12c, in a stepped arrangement. The jaw segments 13 operate similarly to jaw segments 3 as described above, except that they can accommodate measurement of three different nominal diameter pipes.

While I have shown and described several embodiments in accordance with the present invention, it is understood that the same is not limited thereto but also contemplates numerous changes and modifications as known to those skilled in the art and I therefore do not wish to be limited to the details shown and described herein but intend to cover all such changes and modifications as are encompassed by the scope of the appended claims.

I claim:

1. Device for precision measurement of the diameter of thin-walled pipes comprising:

at least three jaw segments which together form a substantially cylindrical body having an outside diameter slightly less than the nominal internal diameter of a pipe to be measured, jaw actuating means for centrically extending said jaw segments radially outwardly to clampingly engage the internal walls of said pipe while maintaining a circular configuration of the outer surface of said jaw segments, said at least three jaw segments are formed from a single cylindrically shaped body of three symmetically located radial slits, the diameter of said cylindrically shaped body being equal to the nominal internal diameter of the pipe to be measured scale means connected to said jaw actuating means for accurately depicting the diametric extent of the outer surface of said jaw segments, wherein said scale means and said jaw actuating means are formed as a three-point inside micrometer with said jaw segments being detachably seated on each of the feeler points of said micrometer, and wherein each of said jaw segments exhibit a plurality of arched outer surfaces in a stepped arrangment to accommodate measurement of pipes with a corresponding plurality of nominal inside diameter.

2. Device according to claim 1, wherein an axial stop surface is formed adjacent each of said outer surfaces for axial abutment with an axial end face of a pipe being measured.

* * * * *